United States Patent [19]

De Wit et al.

[11] Patent Number: 4,685,012

[45] Date of Patent: Aug. 4, 1987

[54] MAGNETIC HEAD WITH ANISOTROPY IN PLANE OF CORE PORTS

[75] Inventors: Hendrik J. De Wit; Marcel Brouha; Ulrich E. Enz; Kornelis Jager; Albertus J. C. Van Der Borst; Gijsbertus W. Turk, all of Eindhoven, Netherlands

[73] Assignee: U.S. Philips Corporation, New York, N.Y.

[21] Appl. No.: 793,027

[22] Filed: Oct. 30, 1985

[30] Foreign Application Priority Data

Nov. 27, 1984 [NL] Netherlands ......................... 8403595

[51] Int. Cl.[4] ..................... G11B 5/127; G11B 5/133; G11B 5/147
[52] U.S. Cl. ................................. 360/125; 360/126; 360/127
[58] Field of Search ................................. 360/125–127

[56] References Cited

U.S. PATENT DOCUMENTS 4,411,716 10/1983 Shiiki et al. ......................... 360/125
4,450,494 5/1984 Fujiwara et al. .................... 360/125
4,488,195 12/1984 Yanagiuchi et al. ................ 360/125
4,578,728 3/1986 Sakakima et al. ................... 360/125

FOREIGN PATENT DOCUMENTS 54-47616 4/1979 Japan ................................. 360/125

Primary Examiner—Robert S. Tupper
Attorney, Agent, or Firm—F. Brice Faller

[57] ABSTRACT

A magnetic head having a core of a magnetizable material around a part of which a coil is provided. A transducing gap is formed between two core parts of a magnetically anisotropic, amorphous ferromagnetic metal. The core parts of a magnetically anisotropic, amorphous ferromagnetic material have a magnetic anisotropy direction induced by a thermal treatment in a magnetic field which is in the plane of the core parts and encloses an angle $\alpha$ with the direction in which magnetic flux traverses the core parts during operation. $\alpha$ preferably is equal to 90°. By these means an increased permeability in the MHz range is reached in combination with a minimum loss component.

4 Claims, 9 Drawing Figures

MAGNETIC HEAD WITH ANISOTROPY IN PLANE OF CORE PORTS

BACKGROUND OF THE INVENTION

The invention relates to a magnetic head having a core of a magnetizable material around a part of which a coil is provided. The transducing gap is formed between two core parts of an amorphous ferromagnetic metal.

Such a magnetic head is known from Japanese Patent Publication Kokai No. 58-147818. Each core part in the known head consists of a stack of laminations of amorphous ferromagnetic material glued together. Before the stacks of laminations are combined to form a head they are subjected to a thermal treatment in a magnetic field perpendicular to the plane of the core parts, which results in a magnetic anisotropy direction perpendicular to the plane of the core parts. This has a favourable effect on the magnetic permeability.

For application at frequencies in the MHz range in which in addition the losses must be minimum, the measure at the known magnetic head, however, does not give an optimum result.

SUMMARY OF THE INVENTION

It is the object of the invention to provide a magnetic head which combines a reproducible, increased magnetic permeability in the MHz range with minimum loss components so that in addition to the permeability, the Q-factor of the head is maximum.

A pair of laminar core parts are of a magnetically anisotropic, amorphous ferromagnetic metal and have a magnetic anisotropy direction which is in the plane of the core parts and encloses an angle α with the direction in which magnetic flux traverses the core parts during operation. α is preferably in the range from 45° to 90°.

The best result is achieved if the angle α between the in-plane magnetic anisotropy direction and the direction of the magnetic flux is 90°. The invention furthermore relates in particular to magnetic heads having core parts of amorphous alloys comprising iron, cobalt, boron and silicon.

The desired anisotropy direction in the plane of the core parts can be realized by subjecting the core parts to a thermal treatment in the presence of a magnetic field which is parallel to the plane of the core parts and which has a direction which is desired with respect to the axis of the core parts. The time and the temperature of the thermal treatment, as well as the strength of the magnetic field, are selected in accordance with the type of amorphous ferromagnetic metal. It is important on the one hand that the magnetic head anisotropy is low for the benefit of a high permeability and that on the other hand the anisotropy is still sufficiently high to stabilise the desired anisotropy direction.

DETAILED DESCRIPTION OF THE PREFERRED EMBODIMENTS

Figure 1:
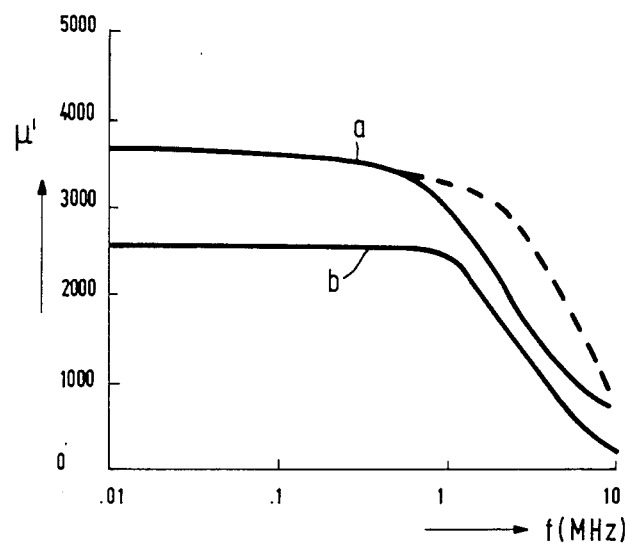
FIG. 1 is a graph showing the frequency-dependence of the real component $\mu'$ of the magnetic permeability.
Figure 2:
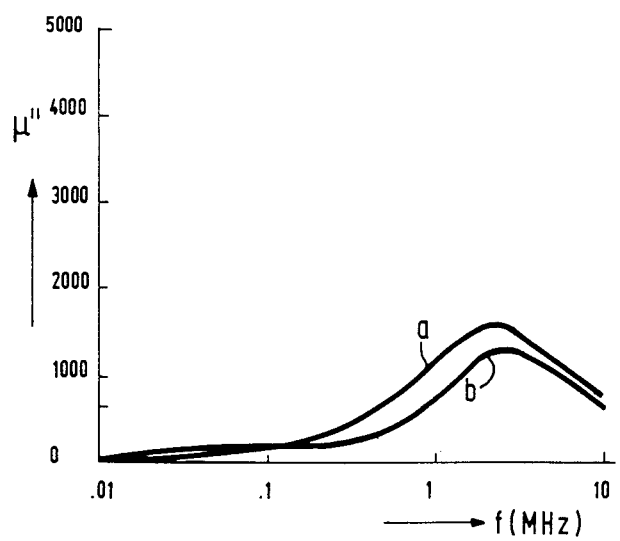
FIG. 2 is a graph showing the frequency dependence of the imaginary component $\mu''$ of two cores of an amorphous ferro magnetic metal with the anisotropy direction in the plane of the core (curve a) and perpendicularly to the plane of the core (curve b), respectively.

Two cores of an amorphous ferromagnetic metal having the composition $Co_{70.3}Fe_{4.7}Si_{15}B_{10}$, thickness 14 μm, width 1 mm, length 5 mm were subjected to a thermal treatment for 10 minutes while simultaneously applying a magnetic field having a strength which is sufficient to saturate the cores magnetically. One core was subjected at a temperature of 350° C. to a magnetic field having a strength of 75 kA/m in the plane of the core, perpendicular to the longitudinal axis, to realize an in-plane magnetic anisotropy (curve "a") perpendicular to the longitudinal axis. The other core was subjected at a temperature of 350° C. to a magnetic field having a strength of 1200 kA/m perpendicular to the plane of the core to realise a magnetic anisotropy (curve "b") perpendicular to the plane of the core. It is to be noted that when firing "vertically" the strength of the magnetic field to be applied must be considerably larger than in the case of the "in-plane" firing. This is a significant disadvantage of the "vertical" firing. The magnetic permeability as a function of the frequency was calculated from measurements of the change in the impedance of coils wound around the cores. The measurements were always carried out in a magnetic field parallel to the longitudinal axis of the core. The results are shown in FIGS. 1 and 2. These figures clearly show the improvement which is achieved by not orienting the magnetic anisotropy direction perpendicularly to the plane of the core (as in case b), but in the plane of the core, perpendicularly to the direction of the magnetic flux (as in case a). The decrease of the magnetic permeability at frequencies above 1 MHz is to be ascribed to eddy currents. When in case a the cores are made thinner than the 14 μm of the example, and in particular thinner than 10 μm, the permeability remains high up to higher frequencies (see the broken line curve in FIG. 1). Cores having a thickness of, for example, 5 μm can be obtained by polishing and/or etching thicker cores. With cores having a magnetic anisotropy direction perpendicular to the plane the reduction in thickness has a detrimental effect: the permeability at higher frequencies decreases even more strongly.

The effect on which the invention is based can be used in magnetic heads in various manners.

Figure 3:
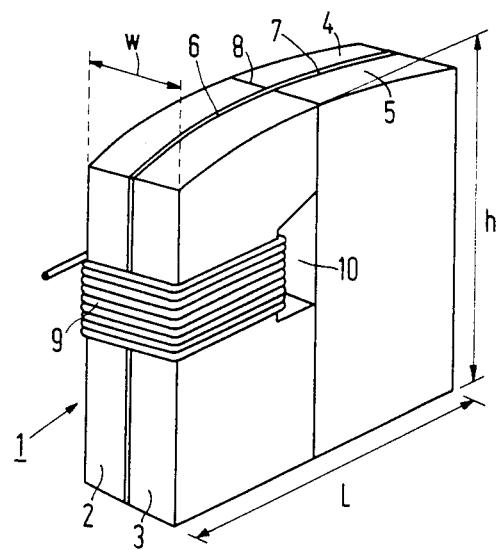
FIG. 3 shows a magnetic head having a core of an amorphous ferromagnetic metal.
Figure 4:
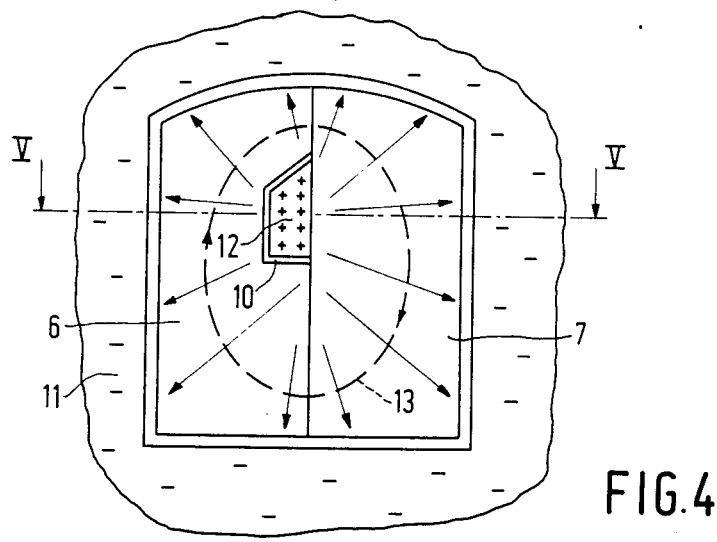
FIG. 4 is an elevation and FIG. 5 is a cross-sectional view of the core of the magnetic head shown in FIG. 3 during manufacture.
Figure 5:
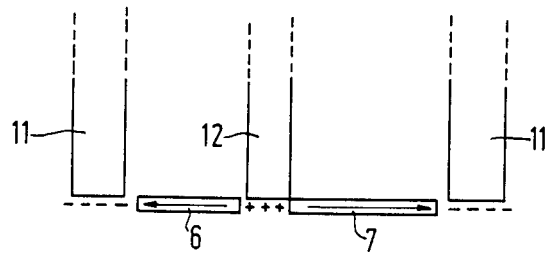

FIG. 3 shows a magnetic head 1 of the sandwich type. Magnetic head 1 consists of two halves each constructed from two substrates 2, 3 and 4, 5 respectively, for example of glass, between which core parts 6 and 7, respectively, of amorphous ferromagnetic metal have been provided. A transducing gap 8 is formed between the core parts 6, 7. A coil 9 is provided around core part 6. The thickness of the core parts 6, 7 is, for example, 15 μm with an overall width w of the magnetic head 1 of 200 μm. In order to avoid eddy currents the core parts 6, 7 may alternatively consist of a laminate of, for example, three sub-core parts of each 5 μm thickness. For a high permeability and minimum losses in the MHz range it is of importance for the in-plane magnetic anisotropy in the core parts 6, 7 to have such a direction as to extend perpendicularly to the direction of the magnetic flux during operation. FIGS. 4 and 5 show how this is realized in the core parts 6, 7 of the magnetic head 1 of FIG. 3. During the thermal treatment described hereinbefore the core parts are subjected to a magnetic field which is generated by the permanent magnets 11 and 12. Permanent magnet 11 fits around the core parts 6, 7 and permanent magnet 12 fits in the coil chamber 10 (FIG. 4). The core parts 6, 7 are provided at the level of the ends of the magnets 11, 12 (FIG. 5).

The arrows in FIGS. 4 and 5 indicate the local direction of the magnetic anisotropy after the thermal treatment. The flux path during operation is shown diagrammatically by 13 (FIG. 4). In the manner described it is hence possible to induce an in-plane anisotropy in the core parts with a direction which locally is perpendicular to the path of the magnetic flux.

Figure 6:
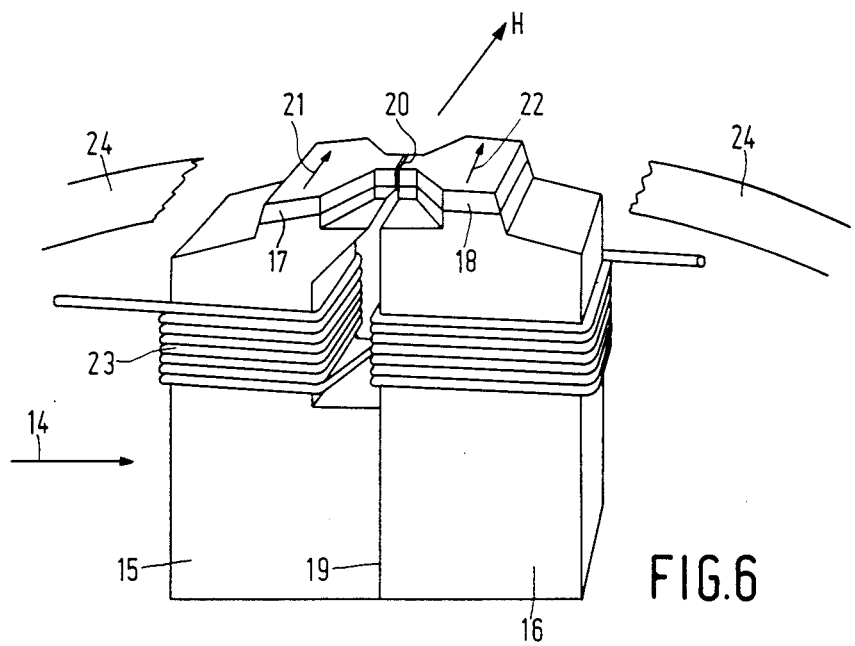
FIG. 6 shows a magnetic head having two core parts of an amorphous ferromagnetic metal which are parallel to a magnetic tape to be moved past the magnetic head during operation.

FIG. 6 shows an alternative magnetic head 14 in which it is simpler to adjust the direction of the in-plane magnetic anisotropy perpendicularly to the path of the magnetic flux.

Magnetic head 14 consists of two halves each constructed from ferrite core parts 15 and 16, respectively, and core parts 17 and 18, respectively, of an amorphous ferromagnetic metal. The two halves are combined by means of an adhesive while forming a rear gap 19 and a transducing gap 20. During the thermal treatment described hereinbefore the core parts 17 and 18 are subjected to a magnetic field H having such a direction that the core parts 17 and 18 after the thermal treatment show an inplane magnetic anisotropy having a direction as indicated by the arrows 21 and 22. In this construction also the direction of the in-plane magnetic anisotropy hence is perpendicular to the direction of the parts of the magnetic flux. In order to complete the magnetic head 14 a coil 23 is provided around the core parts 15 and 16. During operation a magnetic tape 24 is moved past the magnetic head 14 so as to produce a magnetic flux-coupling relationship with the transducing gap 20. The core parts 17, 18 of amorphous metal hence are parallel to the plane of the magnetic tape 24.

Figure 7A:
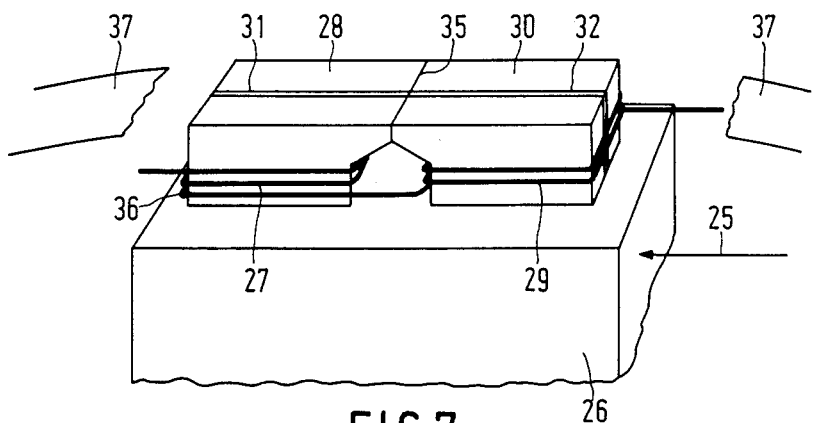
FIG. 7a shows a magnetic head having two core parts of an amorphous ferromagnetic metal which are perpendicular to a magnetic tape to be moved past the magnetic head during operation.
Figure 7B:
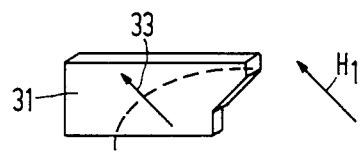
FIGS. 7b and 7c show the core parts of the FIG. 7a magnetic head during manufacture.
Figure 7C:
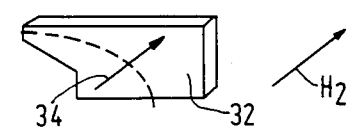

FIG. 7a shows a magnetic head 25 having a rear yoke 26 of ferrite. Two pole shoes each constructed from two substrates 27, 28 and 29, 30, respectively, between which core parts 31 and 32, respectively, of an amorphous ferromagnetic metal have been interposed are provided on the rear yoke 26. The substrates 27, 28, 29, 30 which may have a height h of a few tens of a millimeter are, for example, of glass. Core part 31 which, just as core part 32, may have a thickness of, for example, 5, 10, 15 or 20 μm, has been subjected to a thermal treatment in a magnetic field H having such a direction that core part 31 shows an in-plane magnetic anisotropy with a direction as indicated by the arrow 33 (FIG. 7b). The angle between this direction and the direction of the magnetic flux which traverses the core part 31 during operation varies with the place and roughly assumes values in the range from approximately 45° to approximately 90°. Core part 32 has been subjected to a thermal treatment in a magnetic field $H_2$ with such a direction that core part 32 shows an in-plane magnetic anisotropy with a direction as indicated by arrow 34 (FIG. 7c). The same applies here as to what has been noted with respect to the description of core part 31. During the manufacture the core part 31 interposed between the substrates 27 and 28 is placed opposite to the core part 32 interposed between the substrates 29 and 30 and is bonded thereto by means of an adhesive while forming a transducing gap 35.

The magnetic head 25 is completed by a coil 36 provided around the core parts 31 and 32. In this construction the core parts 31, 32 are provided so as to be perpendicular with respect to the plane of a magnetic tape 37 to be moved past the magnetic head 25 during operation. This construction has advantages with respect to the magnetic head shown in FIG. 6 as regards detrition. With respect to the FIG. 3 magnetic head, the FIG. 7 magnetic head is easier to manufacture.

What is claimed is:

1. A magnetic head having a core of a magnetizable material around a part of which a coil is provided, and comprising two laminar core parts of an amorphous ferromagnetic metal, said parts being coplanar and defining a transducing gap therebetween, characterized in that the core parts are of a magnetically anisotropic, amorphous ferromagnetic metal and have a magnetic anisotropy direction which is in the plane of the core parts and encloses an angle α with the direction in which magnetic flux traverses the core parts during operation, where $45° \leq \alpha \leq 90°$.

2. A magnetic head as claimed in claim 1, characterized in that $\alpha = 90°$.

3. A magnetic head as claimed in claim 1, characterized in that the core parts consist of an iron, cobalt, boron and silicon-containing amorphous alloy.

4. A magnetic head as claimed in claim 2, characterized in that the core parts consist of an iron, cobalt, boron and silicon-containing amorphous alloy.

* * * * *